US007938638B2

(12) United States Patent
Di Rienzo et al.

(10) Patent No.: US 7,938,638 B2
(45) Date of Patent: May 10, 2011

(54) MOULD FOR THE INJECTION-MOULDING A COMPONENT COMPRISING TWO PORTIONS WHICH ARE COMPOSED OF DIFFERENT MATERIALS

(75) Inventors: Alain Di Rienzo, Deuil la Barre (FR); Annabelle Roy-Martinache, Pontoise (FR)

(73) Assignee: Faurecia Interieur Industrie, Nanterre (FR)

( * ) Notice: Subject to any disclaimer, the term of this patent is extended or adjusted under 35 U.S.C. 154(b) by 268 days.

(21) Appl. No.: 12/162,003

(22) PCT Filed: Jan. 25, 2007

(86) PCT No.: PCT/FR2007/000145
§ 371 (c)(1),
(2), (4) Date: Apr. 29, 2009

(87) PCT Pub. No.: WO2007/085735
PCT Pub. Date: Feb. 8, 2007

(65) Prior Publication Data
US 2010/0019124 A1  Jan. 28, 2010

(30) Foreign Application Priority Data

Jan. 27, 2006  (FR) ...................................... 06 00778

(51) Int. Cl.
*B29C 45/32* (2006.01)
(52) U.S. Cl. ...................... 425/130; 264/255; 264/328.7; 425/572; 425/DIG. 10; 425/DIG. 58

(58) Field of Classification Search .................. 425/130, 425/572, DIG. 10, DIG. 58; 264/255, 328.7
See application file for complete search history.

(56) References Cited

U.S. PATENT DOCUMENTS

| 6,039,558 A * | 3/2000 | Park et al. ..................... 425/556 |
| 7,695,270 B2 * | 4/2010 | Roy-Martinache et al. .. 425/130 |
| 2006/0045933 A1 * | 3/2006 | Chen et al. ..................... 425/438 |

FOREIGN PATENT DOCUMENTS

| DE | 101 31 142 A1 | 1/2003 |
| JP | 3-61520 A | 3/1991 |
| JP | 3-184818 A | 8/1991 |
| JP | 3-184819 A | 8/1991 |
| JP | 7-16873 A | 1/1995 |

OTHER PUBLICATIONS

Kraft, "Erweiterte Anwendungsbereiche für das Mehrkomponenten-Spritzgießen," Kuntstoffe, vol. 83, No. 6, pp. 429-433 (Jun. 1, 1993).

* cited by examiner

*Primary Examiner* — Tim Heitbrink
(74) *Attorney, Agent, or Firm* — Young & Thompson

(57) ABSTRACT

This mould is of the type including a moulding cavity (10), and at least one panel (16, 18, 20) which is for separating the cavity into at least two moulding compartments (24, 26) and which is movable, between a position for separating the two compartments (24, 26) and a rest position, through an opening (22) which is provided in a wall (12) of the cavity (10). The mould further includes at least one shutter (32, 34) which is movable between an open position, in which the shutter (32, 34) is disengaged from the opening (22), and a closed position, in which the shutter (32, 34) closes at least a region of the opening (22).

19 Claims, 9 Drawing Sheets

MOULD FOR THE INJECTION-MOULDING A COMPONENT COMPRISING TWO PORTIONS WHICH ARE COMPOSED OF DIFFERENT MATERIALS

FIELD OF THE INVENTION

The present invention relates to a mould for injection-moulding a component comprising at least a first portion and a second portion which are contiguous, are from moulding operations and are composed of different materials, of the type comprising a moulding cavity, and at least one panel for separating the cavity into at least two compartments for moulding the first and second portions, the panel being movable between an active position, in which the panel extends in the cavity in order to separate it into at least two compartments, and a rest position, in which the panel is withdrawn from the cavity in order to join together the at least two compartments, the panel moving between the active position and the rest position through an opening which is provided in a wall of the cavity.

BACKGROUND OF THE INVENTION

Such a mould allows a component of plastics material to be moulded, comprising two portions of different types and/or colours by successively moulding the first portion by means of a plastics material, then the second portion by means of another different plastics material.

To do so, the panel is arranged in an active position so as to isolate a first compartment, a first plastics material which is intended to form the first portion is injected into the first compartment, the first portion is allowed to solidify at least partially, the panel is moved into a rest position in order to join together the two compartments and a second plastics material which is intended to form the second portion is injected into the second compartment. The second portion comes into contact with the first portion and adheres thereto by means of welding or adherent-bonding of the plastics materials with respect to each other.

In order to ensure the sealing between the compartments in the active position of the panel, it is possible for an edge of the panel to be in sealing contact with a first contact zone of the wall of the cavity.

In order to ensure the sealing of the second compartment in the rest position of the panel, it is possible for the edge of the panel to tightly block the opening through which it moves. The edge is adapted in this case to the zone of the wall surrounding the opening.

Nevertheless, this limits the shapes which may be obtained because it requires that the contact zone and the zone surrounding the opening correspond to each other.

This constraint constitutes a disadvantage because it is often desirable to construct components of plastics material comprising a plurality of adjacent portions of different types and/or colours, having non-planar surfaces which do not correspond to each other.

SUMMARY OF THE INVENTION

An object of the invention is to provide a mould for injection-moulding allowing the construction of a component comprising a first portion and a second portion, which are contiguous, are from a moulding operation and are composed of different materials, and having non-planar walls not corresponding to each other.

To this end, the invention relates to a moulding mould of the above-mentioned type, characterised in that it further comprises at least one shutter which is movable between an open position, in which the shutter is disengaged from the opening in order to allow the panel to be moved into an active position, and a closed position, in which the shutter closes at least a region of the opening in order to close the cavity when the panel is in a rest position.

According to other embodiments, the mould comprises one or more of the following features, taken in isolation or in accordance with any technically possible combination:
  the panel is movable, between the active position and the rest position, in a direction parallel with a first plane, the shutter being movable between the closed position and the open position in a direction parallel with a second plane, the first plane and the second plane intersecting;
  it comprises a plurality of panels, the panels in an active position abutting each other and forming a partition for separating the two compartments;
  it comprises at least one panel which, in the rest position, is withdrawn from the opening at the side opposite the cavity;
  it comprises at least one panel which, in the rest position, extends through the opening and cooperates with at least one shutter in the closed position in order to close the opening;
  it comprises at least one panel which, in the rest position, extends through the opening and cooperates with two shutters in the closed position in order to close the opening, the two shutters abutting the panel which is interposed between the two shutters;
  it comprises two panels which, in the rest position, extend through the opening and cooperate with a shutter in the closed position in order to close the opening, the shutter abutting the two panels and being interposed between the two panels;
  the cavity is delimited between two non-planar surfaces which are opposite each other, the opening being arranged in one of the surfaces, the panel moving, in the active position, into sealing contact with the other of the two surfaces;
  it comprises at least one panel which has a recess which delimits, in the active position of the panel, a moulding space which is in communication with the first moulding compartment and which has a shape which is suitable for forming, on the first portion, a shape for mutual engagement between the first portion and the second portion;
  the recess is formed at the joint between a contact region of the panel in sealing contact, in the active position of the panel, with another element of the mould in order to separate the first and second compartments, and a face of the panel delimiting the first compartment;
  the moulding space is defined between the recess and a surface of the wall of the cavity opposite the opening in sealing contact with the contact region of the panel; and
  the panel having the recess is a panel which, in the rest position, is withdrawn from the opening at the side opposite the cavity, or a panel which, in the rest position, closes the opening.

The invention also relates to a method for injection-moulding a component comprising at least a first portion and a second portion which are contiguous, are from a moulding operation and are composed of different materials, comprising the successive steps of:

moving at least one panel into an active position, in which the panel extends in a moulding cavity and separates it into at least two compartments for moulding the first and second portions;

injecting a first material into a first one of the two compartments;

moving the at least one panel into a rest position, in which the panel is withdrawn from the cavity through an opening of a wall of the cavity, in order to join together the two compartments;

closing the opening at least partially by means of at least one closure shutter;

injecting a second material into a second one of the two compartments.

According to optional features of the method:

at least one panel is moved into a rest position in which it is withdrawn from the opening;

at least one panel is moved into a rest position, in which the panel cooperates with at least one shutter in order to close the opening.

The invention further relates to a moulded component which comprises at least a first portion and a second portion which are contiguous, are from moulding operations and are composed of different materials, and which is produced by means of a mould as defined above, or in accordance with a method, as defined above.

BRIEF DESCRIPTION OF THE DRAWINGS

The invention and its advantages will be better understood from a reading of the following description which is given purely by way of example and with reference to the appended drawings, in which.

DETAILED DESCRIPTION OF THE INVENTION

Figure 1:
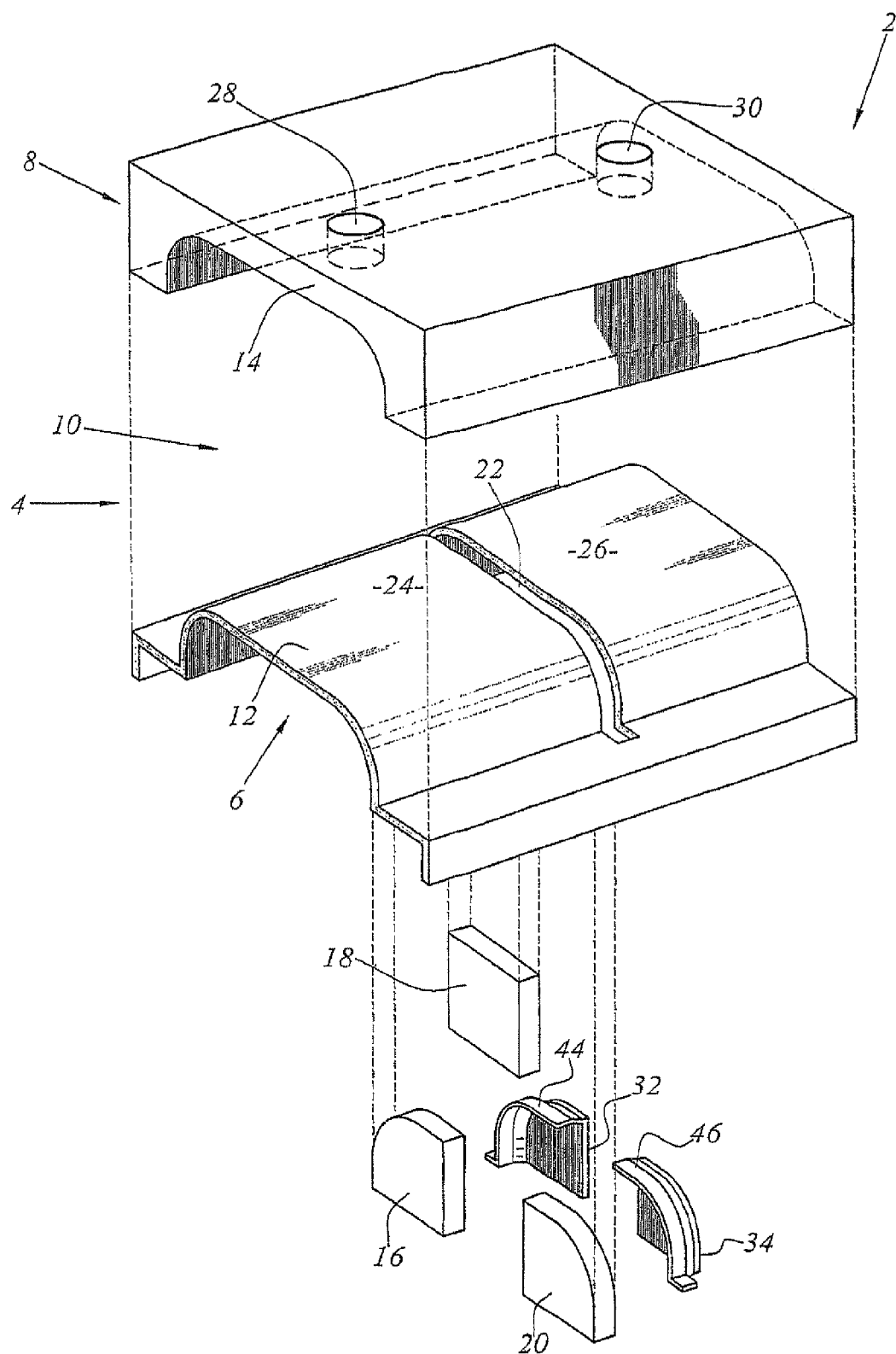
FIG. 1 is a schematic perspective view of a mould in accordance with a first embodiment of the invention.

As illustrated in FIG. 1, the mould 2 comprises a lower die 6 and an upper die 8 which together define, when they are joined together, a mould cavity 10 whose wall is defined by a surface 12 of the die 6 and a surface 14 of the die 8 facing it. The surfaces 12 and 14 are non-planar.

The mould 2 comprises a plurality of panels 16, 18, 20, in this instance three of them, which can be inserted into the cavity 10 by way of an elongate opening 22 which is provided in the surface 12 in order to divide the cavity 10 into two moulding compartments 24 and 26. The panel 18 is located between the panels 16 and 20.

The mould 2 comprises separate means for supplying the compartments 24 and 26 with plastics material in the liquid or semi-liquid state, comprising an opening 28 for supplying the compartment 24 and an opening 30 for supplying the compartment 26, which are provided in the die 8.

The mould 2 further comprises shutters 32, 34, two of them in this instance, each allowing an end region of the opening 22 to be closed.

Figure 2:
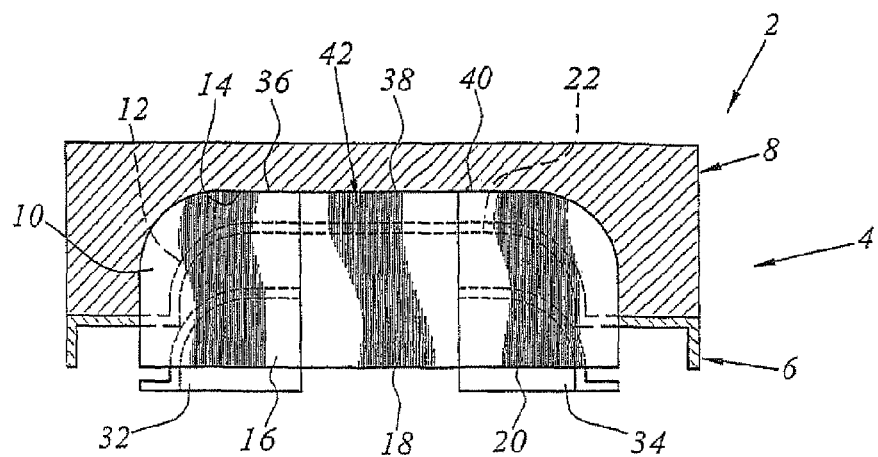
FIGS. 2 to 4 are schematic sectioned front views of the mould of FIG. 1, illustrating movable shutters and panels of the mould in various configurations.
Figure 3:
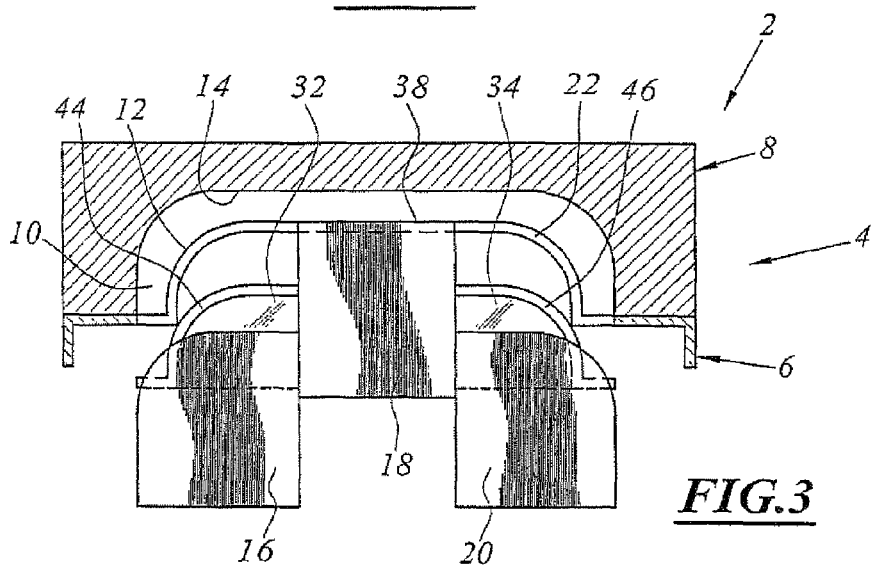
Figure 4:
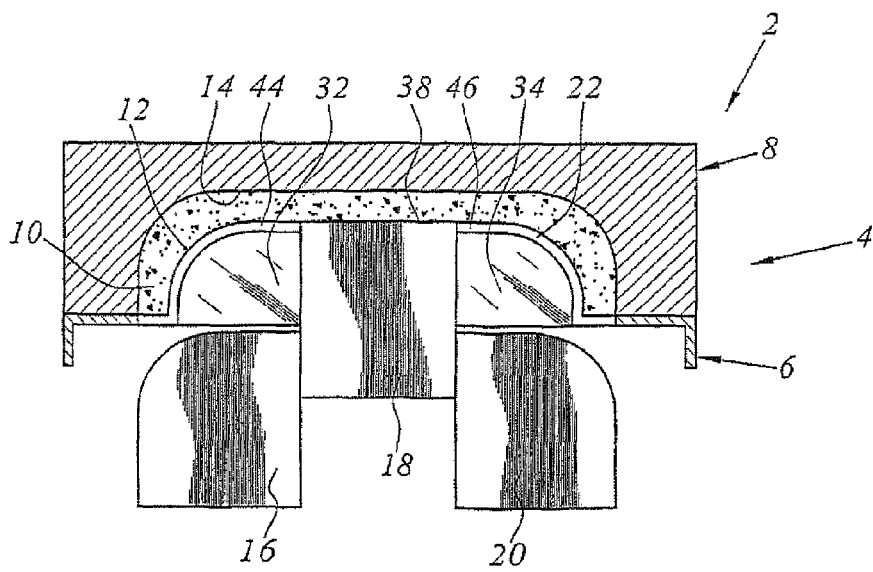

As illustrated in FIGS. 2 to 4, each of the panels 16, 18 and 20 can be moved through the opening 22 between an active position (FIG. 2), in which it extends in the cavity 10 in order to divide it into two compartments, and a rest position (FIGS. 3 and 4), in which it is withdrawn from the cavity 10 through the opening 22.

In the active position (FIG. 2), each of the panels 16, 18 and 20 has an edge 36, 38 and 40, respectively, in sealing contact with the surface 14. The panels 16, 18 and 20 abut each other in a sealing manner. The panels 16, 18 and 20 thereby form a partition 42 which separates the compartments in a sealing manner.

The edge 38 is rectilinear and the edges 36 and 40 are in the form of circular arcs.

In the rest position, the panels 16 and 20 are withdrawn from the opening 22 at the side opposite the cavity 10. In other words, the panels 16 and 20 are disengaged from the opening 22. The panel 18 is withdrawn from the cavity 10 so that the edge 38 tightly closes the central region of the opening 22.

The shutters 32 and 34 can be moved between an open position (FIGS. 2 and 3), in which each of the shutters 32 and 34 is disengaged from the opening 22 in order to allow the panels 16, 18 and 20 to extend in an active position into the cavity 10 through the opening 22, and a closed position (FIG. 4), in which each of the shutters 32 and 34 closes an end region of the opening 22.

The shutters 32 and 34 have plates 44 and 46, respectively, which are introduced into the opening 22 in the closed position of the shutters 32 and 34 and which have profiles which adapt to the surface 12 in the end regions of the opening 22.

In the closed position of the shutters 32 and 34, the plates 44 and 46 abut against the edge 38 of the panel 18 in the rest position and cooperate therewith in order to close the opening 22 tightly. The panel 18 is interposed between the shutters 32 and 34.

In this manner, in the rest position, the panels 16 and 20 are replaced by the shutters 32 and 34, the shutters cooperating with the panel 18 in order to close the opening 22 so that the cavity 10 is closed.

Figure 5:
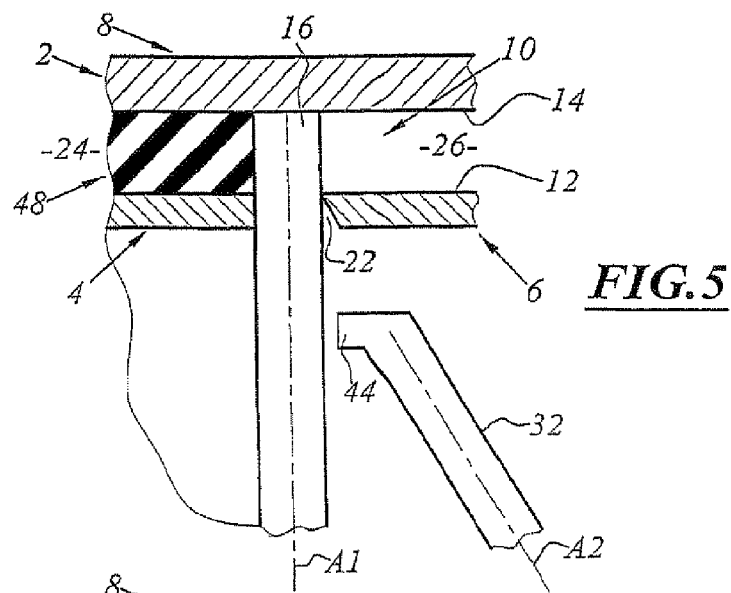
FIGS. 5 to 7 are schematic sectioned side views of the mould of FIG. 1, illustrating a panel and a shutter in positions corresponding to the configurations of FIGS. 2 to 4, respectively.
Figure 6:
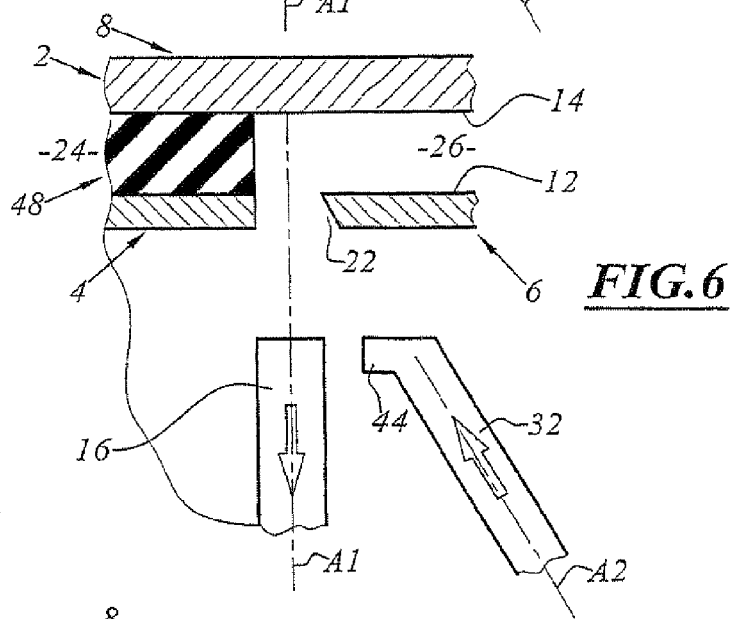
Figure 7:
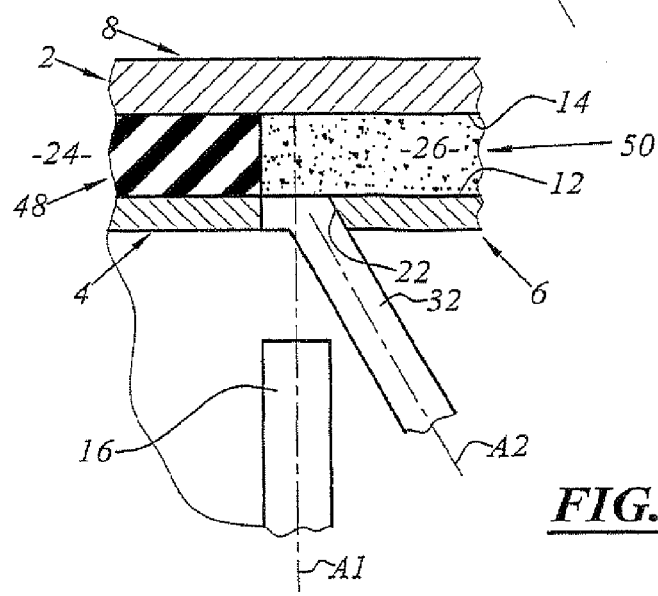

With reference to FIGS. 5 to 7, in which only the panel 16 and the shutter 32 are visible, the panel 16 can be moved through the opening 22 between its active position (FIG. 5) and its rest position (FIGS. 6 and 7) in translation in a direction A1, and the shutter 32 can be moved between its open position (FIGS. 5 and 6) and its closed position (FIG. 7) in a direction A2, the directions A1 and A2 being parallel with intersecting planes.

The panel 20 and the shutter 34 move in a similar manner.

In this manner, in the open position, the shutters 32 and 34 in the open position do not prevent movement of the panels 16 and 20 and the shutters 32 and 34 can move into a closed position without being impeded by the panels 16 and 20 in a rest position.

During a method for producing a component of moulded plastics material, in a first step corresponding to FIGS. 2 and 5, the panels 16, 18 and 20 are in an active position so that the compartment 24 is delimited by the surfaces 12 and 14 and the panels 16, 18 and 20, and a first plastics material is injected into the compartment 24 in order to form a first portion 48 of the component.

In a second step corresponding to FIGS. 3 and 6, after the plastics material has solidified, the panels 16, 18 and 20 are moved into a rest position so that the compartments 24 and 26 are placed in communication.

The lateral end regions of the opening 22 are thereby disengaged, the central region being closed by the panel 18.

In a third step corresponding to FIGS. 4 and 7, the shutters 32 and 34 are moved into their closed position so that the opening 22 is closed by the shutters 32 and 34 and the panel 18, and the compartment 26 is delimited between the surfaces 12 and 14, the first material, and the shutters 32 and 24, and the panel 18. A second plastics material is injected into the compartment 26 in order to form a second portion 50 of the component.

Figure 8:
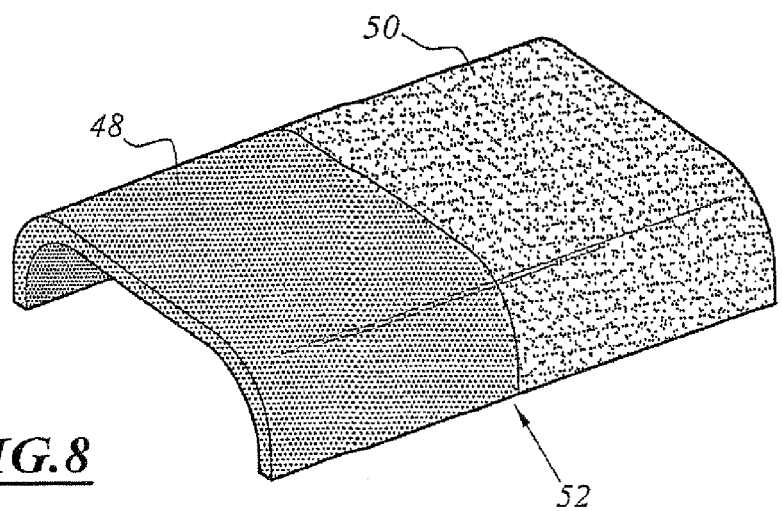
FIG. 8 is a schematic view of a component moulded by means of the mould of FIG. 1.

The second material solidifies, coming into contact with the first material and becoming connected thereto by means of welding or adherent-bonding. Finally, a component 52 as illustrated in FIG. 8 is obtained.

Advantageously, the cooling or solidifying of the first plastics material injected is partial, in such a manner that the first material is substantially viscous enough for, when the second material is injected, interpenetration of the two materials to be brought about to a greater or lesser extent.

In accordance with an increasing level of cooling, a weld is obtained, that is to say, interpenetration of the two materials or bonding, that is to say, surface adhesion between the two materials by superficial fusion.

In order to mould a subsequent component, the panels are moved in accordance with a transposed sequence.

Figure 9:
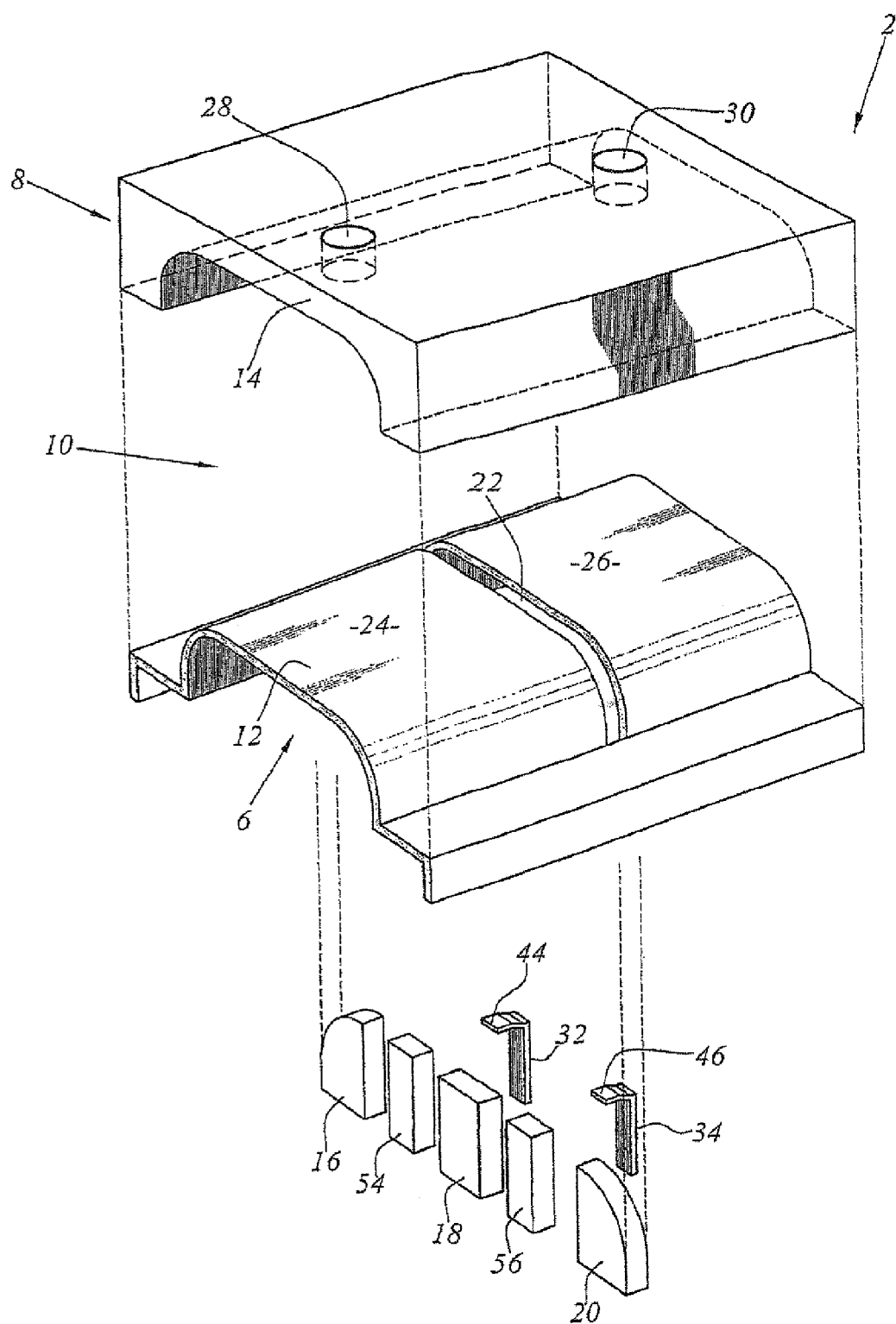
FIG. 9 is a view similar to that of FIG. 1, illustrating a mould in accordance with a second embodiment.

The embodiment of FIG. 9, in which the references to the elements similar to those of FIGS. 1 to 7 have been kept, differs from the first embodiment owing to the number of panels for separating the compartments 24 and 26.

The mould 2 comprises two lateral panels 16 and 20, a central panel 18 and two intermediate panels 54 and 56 which are interposed between the panels 16 and 18 and the panels 18 and 20, respectively.

In their active position (FIG. 10), the panels 16, 18, 20, 54 and 56 extend in the cavity 10 and abut each other in order to form a partition 42 for separating the compartments 24 and 26 in a sealing manner.

In this position, the edges 36, 58, 38, 60 and 40 of the panels 16, 54, 18, 56 and 20, respectively, are in sealing contact with the surface 14.

The length of the opening 22 has a lesser extent than the partition 42. The panels 16 and 20 extend laterally beyond the ends of the opening 22 in order to move into contact with the surface 14.

In their rest position (FIG. 14), the panels 54 and 56 are withdrawn from the opening 22, at the side opposite the cavity, so that they do not interfere with the shutters 32 and 34, and the panels 16, 18 and 20 are arranged in such a manner that their edges 36, 38 and 40 each close a region of the opening 22.

In the open position (FIG. 10), the shutters 32 and 34 are disengaged from the opening 22.

In the closed position (FIG. 14), the shutters 32 and 34 are interposed between the panels 16 and 18 and the panels 18 and 20, respectively, and cooperate therewith in order to close the opening 22.

Figure 10:
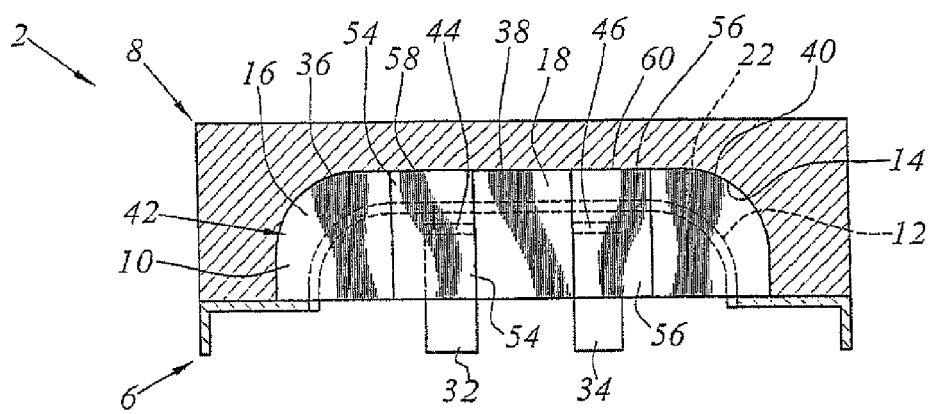
FIGS. 10 to 14 are schematic sectioned front views of the mould of FIG. 9, illustrating movable shutters and panels of the mould in various configurations.
Figure 14:
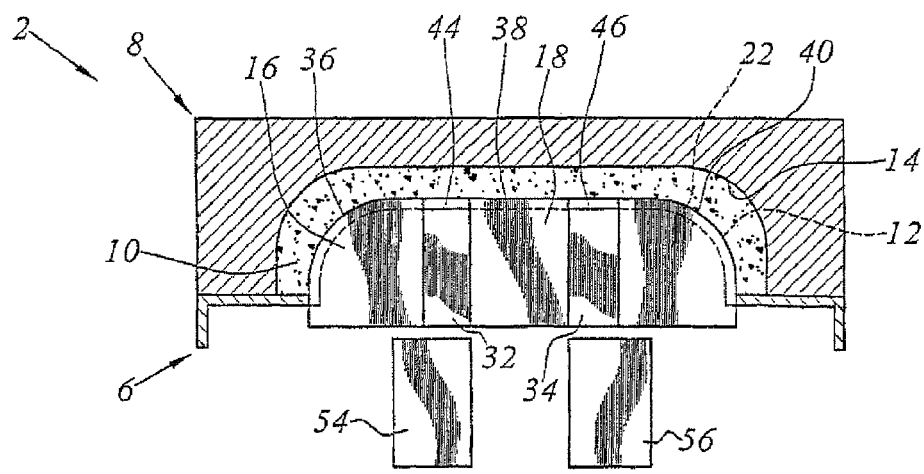

The movement from the configuration of FIG. 10 to that of FIG. 14 is carried out, for example, firstly by moving the panels 54 and 56 into a rest position (FIG. 11), which provides for spaces between the panels 16 and 18 and between the panels 18 and 20.

Figure 11:
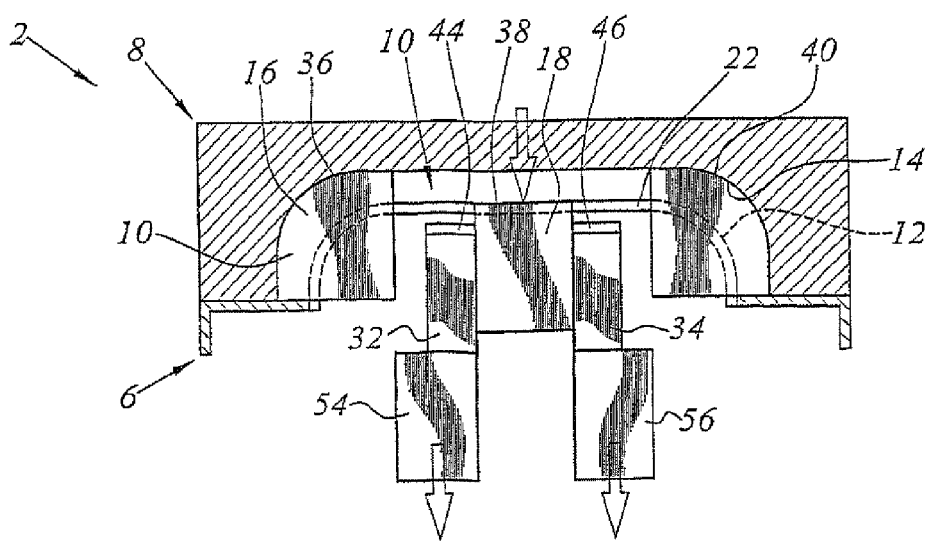

Sequentially or simultaneously, the panel 18 is moved into a rest position (FIG. 11).

Figure 12:
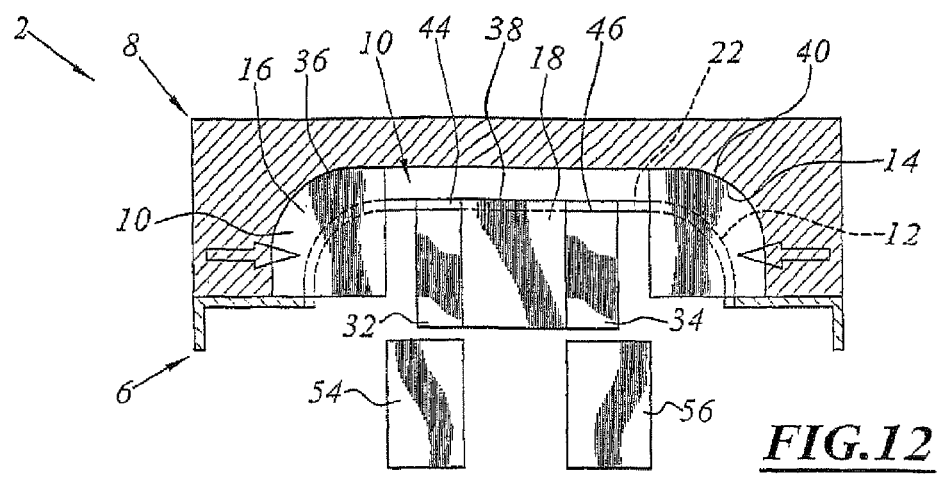

Subsequently, the shutters 32 and 34 are moved so that their plates 44 and 46 close the opening 22 at one side and the other of the panel 18, making use of the disengaged spaces between the panels 16, 18 and 20 (FIG. 12).

The shutters 32 and 34 are not as wide as the panels 54 and 56.

Figure 13:
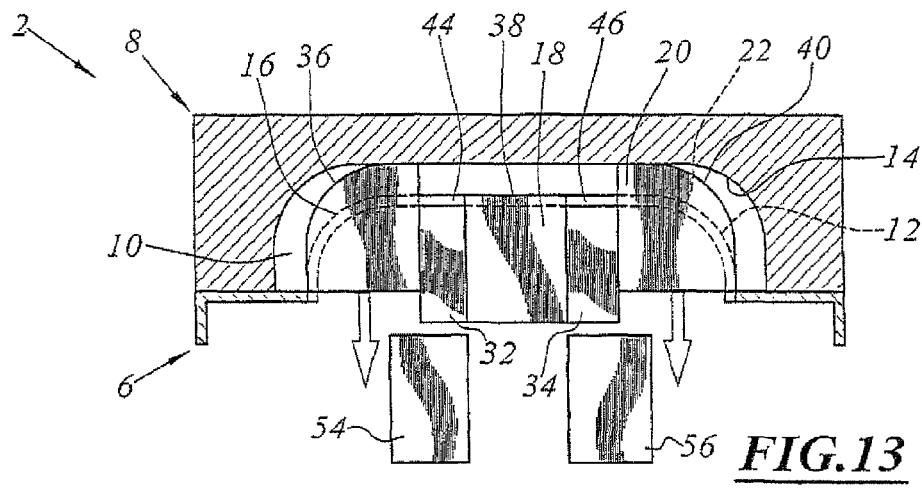

Therefore, it is possible, based on the configuration reached (FIG. 12), to move the panels 16 and 20 towards the panel 18 (FIG. 13), in order to be able subsequently to move them towards their rest position through the opening 22 (FIG. 14).

In this position, each of the shutters 32 and 34 is interposed between and in abutment against two adjacent panels.

The panels 16 and 20 move between their active position and their rest position successively in two perpendicular directions, one of the directions being parallel with the movement direction of the panel 18.

Generally, the panels may move in accordance with rectilinear or non-rectilinear movements in directions which are parallel, perpendicular or inclined relative to each other, depending on the manner in which they must cooperate in an active position and in a rest position.

Figure 15:
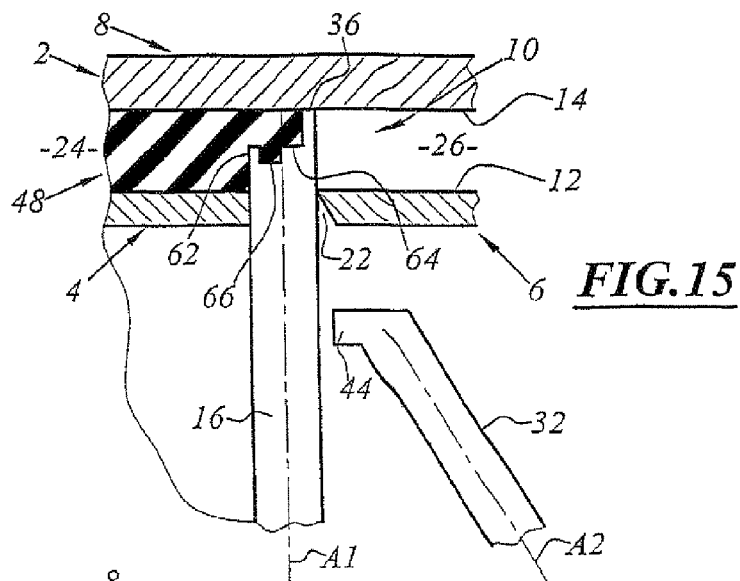
FIGS. 15 to 17 are views similar to that of FIGS. 5 to 7, illustrating a panel in accordance with a construction variant, and a corresponding shutter.
Figure 16:
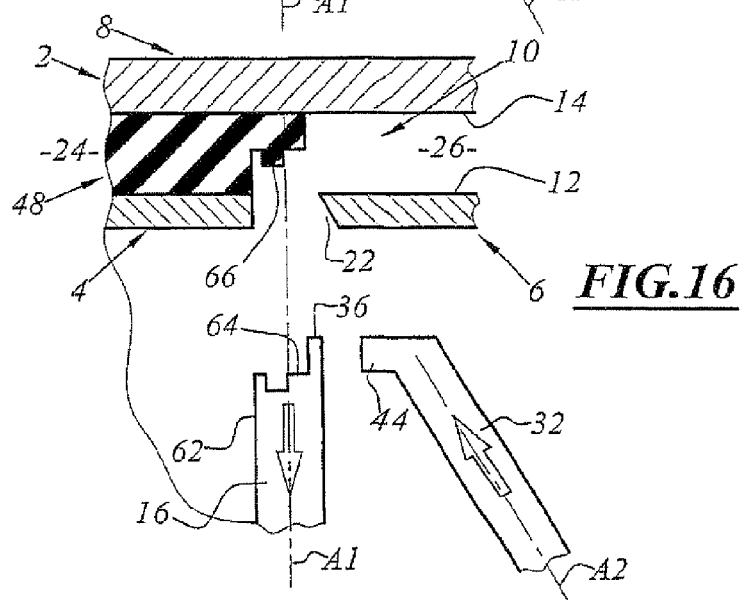
Figure 17:
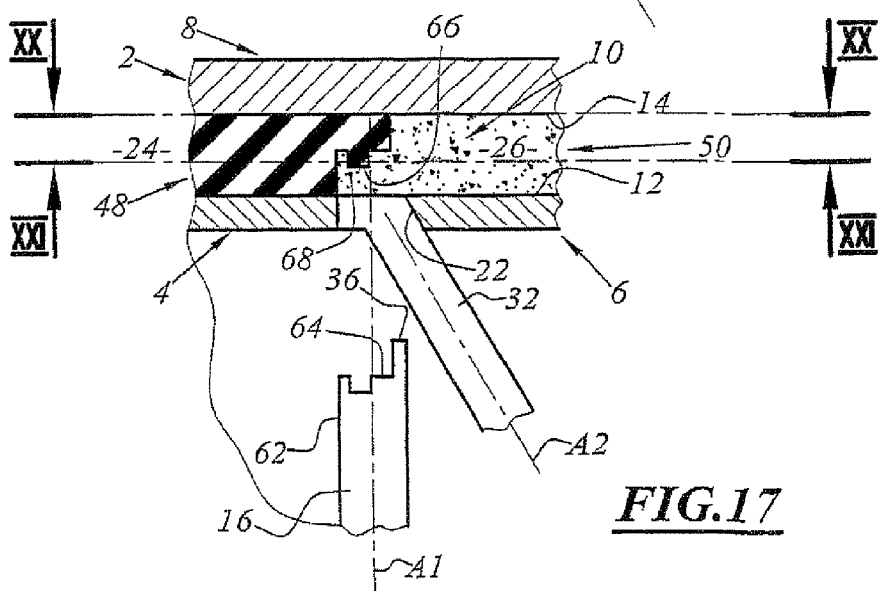

As illustrated in FIGS. 15 to 17, a panel 16 differs from the corresponding panel of FIGS. 5 to 7 in that it comprises, at the joint between its edge 36 provided for sealing contact with respect to the surface 14, and its face 62 directed towards the compartment 24, a recess 64 delimiting, with the surface 14 when the panel 16 is in the active position (FIG. 15), a moulding space for a projecting engagement member 66 on the first portion 48 (FIGS. 15 and 16), complementing the space.

During the second moulding step which is carried out after the panel 16 is moved into an inactive position withdrawn from the opening 22 (FIG. 16) and the shutter 32 has been moved into a position (FIG. 17) for closing the opening 22, an engagement member 68 which complements the engagement member 66 is formed on the second portion 50 in a moulding space which is in communication with the compartment 26 and which is delimited between the shutter 32 and the portion 48.

Figure 18:
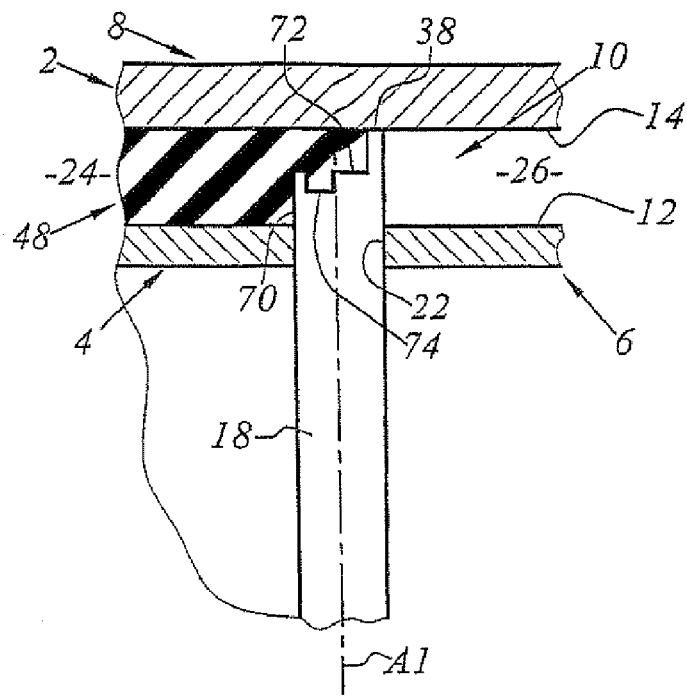
FIGS. 18 and 19 are views similar to that of FIGS. 15 and 17, illustrating another panel of the mould in accordance with the third embodiment.
Figure 19:
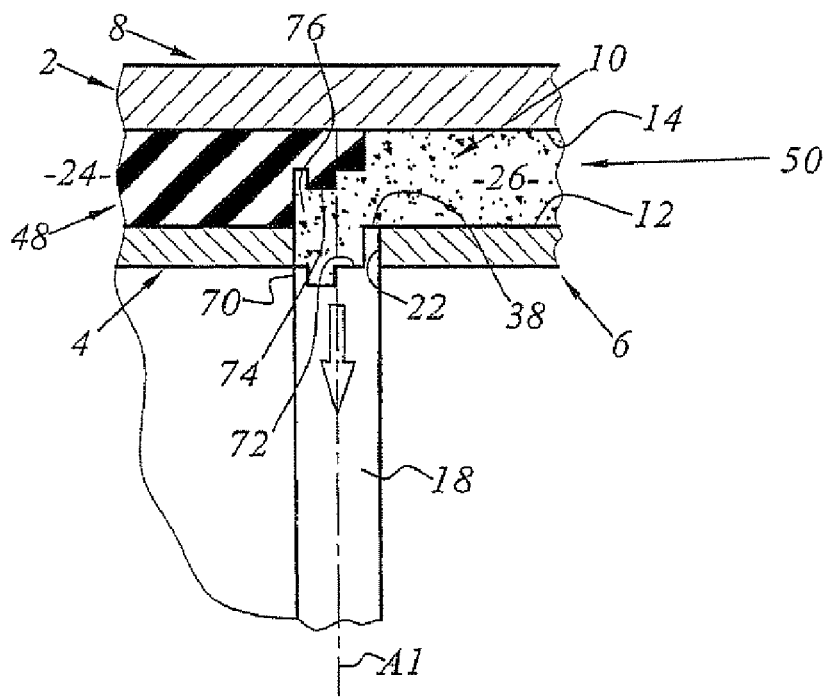

As illustrated in FIGS. 18 and 19, in a similar manner, it is possible to provide for a panel 18 which, in the rest position (FIG. 19), closes the opening 22 which is suitable for forming complementary engagement members which engage with the portions 48 and 50, by making provision, at the joint between its edge 38 provided for sealing contact with the surface 14, and its face 70 directed towards the compartment 24, for a recess 72 which delimits, with the surface 14 when the panel 18 is in an active position (FIG. 18), a space for moulding a projecting engagement member 74. In a rest position (FIG. 19), the panel 18 allows moulding of a complementary engagement member 76 on the second portion 50, in a moulding space which is in communication with the compartment 26 and which is delimited between the recess 72 and the portion 48.

A mould comprising one or more panels 16 and/or one or more panels 18 as illustrated in FIGS. 15 to 19 allows the construction of a sequentially bi-injected component which has improved mechanical strength between the two portions of the bi-injected component.

It will be noted that, in FIGS. 15 to 19, each of the panels 16 and 18 extends into the cavity 10 through an opening 22 which is provided in a surface 12 delimiting the cavity 10, and moves into sealing contact, in an active position, with an opposite surface 14 delimiting the cavity 10.

The separation of the compartments and the formation of the engagement members are therefore brought about with a limited number of components having simple movements.

Figure 20:
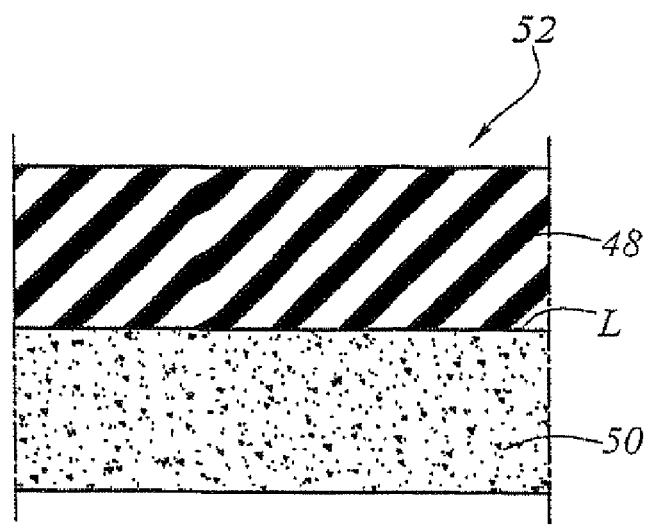
FIGS. 20 and 21 are a front view along XX-XX and a section taken along XXI-XXI of a moulded component of FIG. 17.

FIG. 20 illustrates the component 52, in a top view of its face provided in order to be the visible face. The component 52 is constituted by the first portion 48 and the second portion 50.

FIG. 20 illustrates the fact that the joint line L between the two portions 48 and 50 could be obtained with great sharpness in the absence of interpenetration of the two plastics materials.

Figure 21:
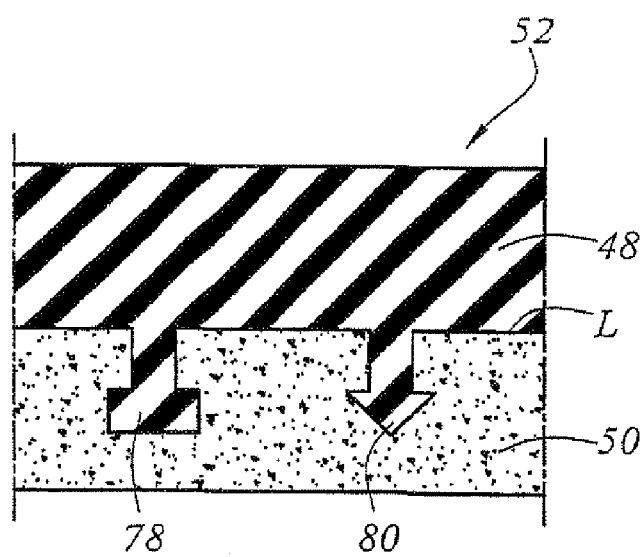

FIG. 21 illustrates the same component 52, viewed in section over the thickness thereof. FIG. 21 illustrates that the mutual engagement shapes 78, 80 between the two portions 48 and 50 could have various profiles.

In the drawing of FIG. 21, the engagement shapes illustrated are of T-shaped form 78 and harpoon-like or arrow-like form 80.

Using closure shutters allows the opening for inserting panels to be closed, even if it has complex three-dimensional geometry. Using some of the panels to close the opening allows the number of shutters to be limited, which makes the mould less expensive to produce. Using shutters further allows adaptation of the size of each of the panels in order to obtain panels which are sufficiently rigid to prevent deformation of the panels when the first plastics material is injected under pressure, breaking the sealing between the abutting panels or with respect to the wall of the cavity.

The moulds and the associated methods which have been described above can be used in order to produce a large variety of components from plastics material, comprising a plurality of adjacent portions which are constituted by plastics material and which are compatible and assembled together by means of welding or adherent-bonding, but which are of different types and/or colours.

The moulds allow bi-material components to be obtained by sequential injection of different materials into the compartments, and also single-material components to be constructed by joining together the compartments before material is injected, then by injecting the same material via one or more supply openings.

It is possible to use panels which bring about sealing with a wall of the moulding cavity and which are provided with recesses allowing the formation of engagement members between portions of a bi-injected component independently of closure shutters, with the advantages of improved mechanical connection of the portions being maintained. In this manner, such panels can be used particularly in a mould which is not provided with shutters and whose openings which allow the panels to be moved are closed, in a rest position of the panels, by all or at least some of the panels.

The invention applies to moulds for constructing components of a motor vehicle dashboard or components of the internal trim of a motor vehicle door, or any other components of plastics material for the interior or exterior of motor vehicles.

The invention claimed is:

1. A method for injection-moulding a component comprising at least a first portion and a second portion which are contiguous, are from a moulding operation and are composed of different materials, comprising the successive steps of:

providing a mould comprising a moulding cavity (10), and at least one panel (16, 18, 20, 54, 56) for separating the cavity into at least two compartments (24, 26) for moulding the first and second portions, the panel being movable between an active position, in which the panel (16, 18, 20, 54, 56) extends in the cavity (10) in order to separate the two compartments (24, 26), and a rest position, in which the panel (16, 18, 20, 54, 56) is withdrawn from the cavity (10) in order to join together the two compartments (24, 26), the panel (16, 18, 20, 54, 56) moving between the active position and the rest position through an opening (22) which is provided in a wall (12) of the cavity (10), said mould further comprising at least one shutter (32, 34) which is movable between an open position, in which the shutter (32, 34) is disengaged from the opening (22) in order to allow the panel (16, 18, 20, 54, 56) to be moved into an active position, and a closed position, in which the shutter (32, 34) closes at least a region of the opening (22) in order to close the cavity (10) when the panel (16, 18, 20, 54, 56) is in a rest position;

moving said at least one panel (16, 18, 20, 54, 56) into the active position, to separate said moulding cavity into the two compartments (24, 26);

injecting a first material into a first one of the two compartments (24, 26);

moving the at least one panel (16, 18, 20, 54, 56) into the rest position in order to join together the two compartments (24, 26);

closing the opening at least partially by means of the least one closure shutter (32 34);

injecting a second material into a second one of the two compartments (24, 26).

2. A method according to claim 1, wherein at least one panel (16, 20; 54, 56) is moved into a rest position in which it is withdrawn from the opening (22).

3. A method according to claim 1, wherein at least one panel (18; 16, 18, 20) is moved into a rest position, in which the panel (18; 16, 18, 20) cooperates with at least one shutter (32, 34) in order to close the opening (22).

4. A method according to claim 2, wherein at least one panel (18; 16, 18, 20) is moved into a rest position, in which the panel (18; 16, 18, 20) cooperates with at least one shutter (32, 34) in order to close the opening (22).

5. A mould (2) for injection-moulding a component comprising at least a first portion and a second portion which are contiguous, are from a moulding operation and are composed of different materials, said mould comprising a moulding cavity (10), and at least one panel (16, 18, 20, 54, 56) for separating the cavity into at least two compartments (24, 26) for moulding the first and second portions, the panel being movable between an active position, in which the panel (16, 18, 20, 54, 56) extends in the cavity (10) in order to separate the two compartments (24, 26), and a rest position, in which the panel (16, 18, 20, 54, 56) is withdrawn from the cavity (10) in order to join together the two compartments (24, 26), the panel (16, 18, 20, 54, 56) moving between the active position and the rest position through an opening (22) which is provided in a wall (12) of the cavity (10), said mould further comprising at least one shutter (32, 34) which is movable between an open position, in which the shutter (32, 34) is disengaged from the opening (22) in order to allow the panel (16, 18, 20, 54, 56) to be moved into an active position, and a closed position, in which the shutter (32, 34) closes at least a region of the opening (22) in order to close the cavity (10) when the panel (16, 18, 20, 54, 56) is in a rest position.

6. A mould according to claim 5, wherein the panel (16, 18, 20, 54, 56) is movable, between the active position and the rest position, in a direction parallel with a first plane, the shutter (32, 34) being movable between the closed position and the open position in a direction parallel with a second plane, the first plane and the second plane intersecting.

7. A mould according to claim 5, wherein said mould comprises a plurality of panels (16, 18, 20, 54, 56), the panels in an active position abutting each other and forming a partition (42) for separating the two compartments (24, 26).

8. A mould according to claim 5, wherein said mould comprises at least one panel (16, 20; 54, 56) which, in the rest position, is withdrawn from the opening (22) at the side opposite the cavity (10).

9. A mould according to claim 5, wherein said mould comprises at least one panel (18; 16, 18, 20) which, in the rest position, extends through the opening (22) and cooperates with at least one shutter (32, 34) in the closed position in order to close the opening (22).

10. A mould according to claim 9, wherein said mould comprises at least one panel (18) which, in the rest position, extends through the opening (22) and cooperates with two shutters (32, 34) in the closed position in order to close the opening (22), the two shutters (32, 34) abutting the panel (18) which is interposed between the two shutters (32, 34).

11. A mould according to claim 9, wherein said mould comprises two panels (16, 18; 18, 20) which, in the rest position, extend through the opening (22) and cooperate with a shutter (32; 34) in the closed position in order to close the opening (22), the shutter (32; 34) abutting the two panels (16, 18; 18, 20) and being interposed between the two panels (16, 18; 18, 20).

12. A mould according to claim 5, wherein the cavity is delimited between two non-planar surfaces (12, 14) which are opposite each other, the opening (22) being arranged in one (12) of the surfaces (12, 14), the panel (16, 18, 20, 54, 56) moving, in the active position, into sealing contact with the other (14) of the two surfaces (12, 14).

13. A mould according to claim 5, wherein said mould comprises at least one panel (16, 18) which has a recess (64, 72) which delimits, in the active position of the panel (26, 18), a moulding space which is in communication with the first moulding compartment (24) and which has a shape which is suitable for forming, on the first portion (48), a shape (66, 74, 78, 80) for mutual engagement between the first portion (48) and the second portion (50).

14. A mould according to claim 13, wherein the recess is formed at the joint between a contact region (36, 38) of the panel (16, 18) in sealing contact, in the active position of the panel (16, 18), with another element of the mould in order to separate the first and second compartments (24, 26), and a face of the panel (16, 18) delimiting the first compartment (24).

15. A mould according to claim 14, wherein the moulding space is defined between the recess (66, 72) and a surface (14) of the wall of the cavity (10) opposite the opening (22) in sealing contact with the contact region (36, 38) of the panel (16, 18).

16. A mould according to claim 13, wherein the panel (16, 18) is a panel (16) which, in the rest position, is withdrawn from the opening (22) at the side opposite the cavity (10), or a panel (18) which, in the rest position, closes the opening (22).

17. A mould according to claim 6, wherein said mould comprises a plurality of panels (16, 18, 20, 54, 56), the panels in an active position abutting each other and forming a partition (42) for separating the two compartments (24, 26).

18. A mould according to claim 10, wherein said mould comprises two panels (16, 18; 18, 20) which, in the rest position, extend through the opening (22) and cooperate with a shutter (32; 34) in the closed position in order to close the opening (22), the shutter (32; 34) abutting the two panels (16, 18; 18, 20) and being interposed between the two panels (16, 18; 18, 20).

19. A mould according to claim 14, wherein the panel (16, 18) is a panel (16) which, in the rest position, is withdrawn from the opening (22) at the side opposite the cavity (10), or a panel (18) which, in the rest position, closes the opening (22).

* * * * *